No. 12,128. REISSUED JUNE 30, 1903.

J. P. SNEDDON.

SUPERHEATER FOR STEAM BOILERS.

APPLICATION FILED APR. 13, 1903.

3 SHEETS—SHEET 1.

WITNESSES

Warren W. Swartz

H. M. Conover

INVENTOR

James P. Sneddon by Baldwin & Hughes his attys

No. 12,128. REISSUED JUNE 30, 1903.

J. P. SNEDDON.

SUPERHEATER FOR STEAM BOILERS.

APPLICATION FILED APR. 13, 1903.

3 SHEETS—SHEET 2.

WITNESSES

Warren W. Swartz

S. T. Mooney

INVENTOR

James P. Sneddon by Barnes & Byrnes his attys

No. 12,128. REISSUED JUNE 30, 1903.
J. P. SNEDDON.
SUPERHEATER FOR STEAM BOILERS
APPLICATION FILED APR. 13, 1903.
3 SHEETS—SHEET 3.
Fig. 3.
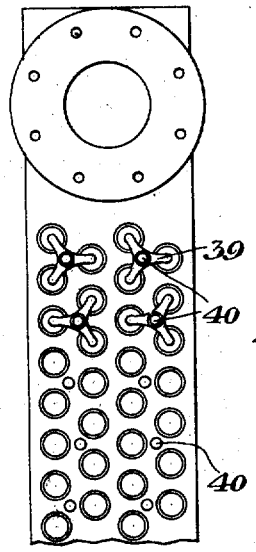
Fig. 4.
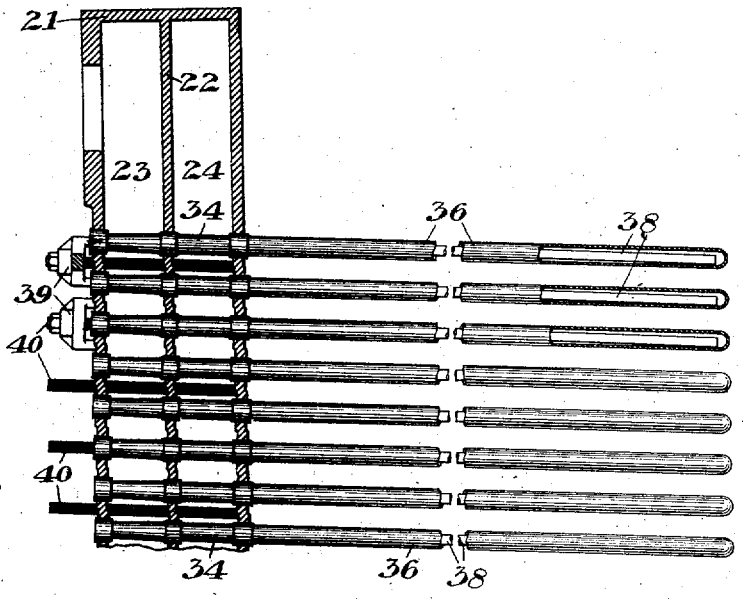
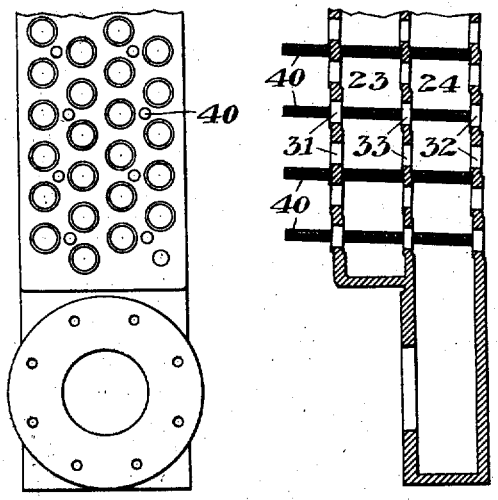
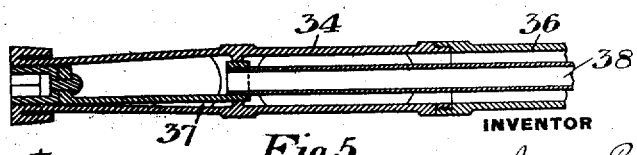
Fig. 5.
WITNESSES
Warren W. Swartz
A. M. Conron
INVENTOR
James P. Sneddon
by Baldwin & Bynes
his attys No. 12,128. Reissued June 30, 1903.

UNITED STATES PATENT OFFICE.

JAMES P. SNEDDON, OF BARBERTON, OHIO, ASSIGNOR, BY MESNE ASSIGNMENTS, TO THE STIRLING COMPANY, OF JERSEY CITY, NEW JERSEY, A CORPORATION OF NEW JERSEY.

SUPERHEATER FOR STEAM-BOILERS.

SPECIFICATION forming part of Reissued Letters Patent No. 12,128, dated June 30, 1903.

Original No. 716,297, dated December 16, 1902. Application for reissue filed April 13, 1903. Serial No. 152,478.

*To all whom it may concern:*

Be it known that I, JAMES P. SNEDDON, a resident of Barberton, in the county of Summit and State of Ohio, have invented a new and useful Improvement in Superheaters; and I do hereby declare the following to be a full, clear, and exact description thereof.

My invention relates to superheaters for steam-boilers; and its object is to provide a superheater which can be applied to any water-tube boiler, which occupies a minimum of space, which is accessible at all times and easy of inspection and repair, and which possesses a high degree of efficiency.

To this end it comprises, generally stated, a steam-chamber or header which is placed outside the furnace-walls or in other positions, so that it is easily accessible, and independently-removable superheating-tubes connected to said header and projecting into the furnace-chamber, said header and tubes being constructed on the principle of the well-known Niclausse boiler—that is, the steam-chamber or header is divided by a diaphragm or partition into two compartments—the superheating-tubes comprising outer tubes communicating with one of said compartments and circulating-tubes projecting into said outer tubes and communicating with the other compartment.

In the accompanying drawings I have shown my invention applied to a boiler of the well-known Stirling type, and in said drawings—

Figure 1:
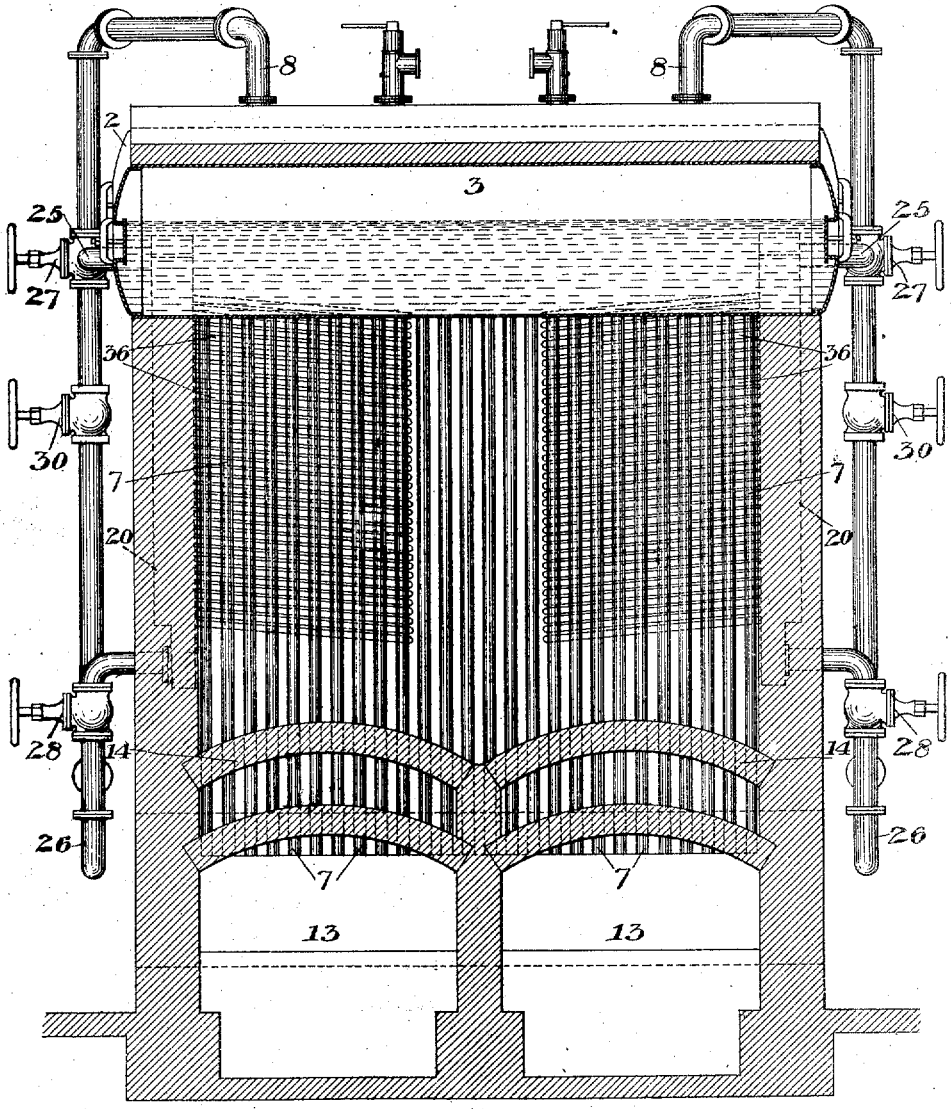
Figure 2:
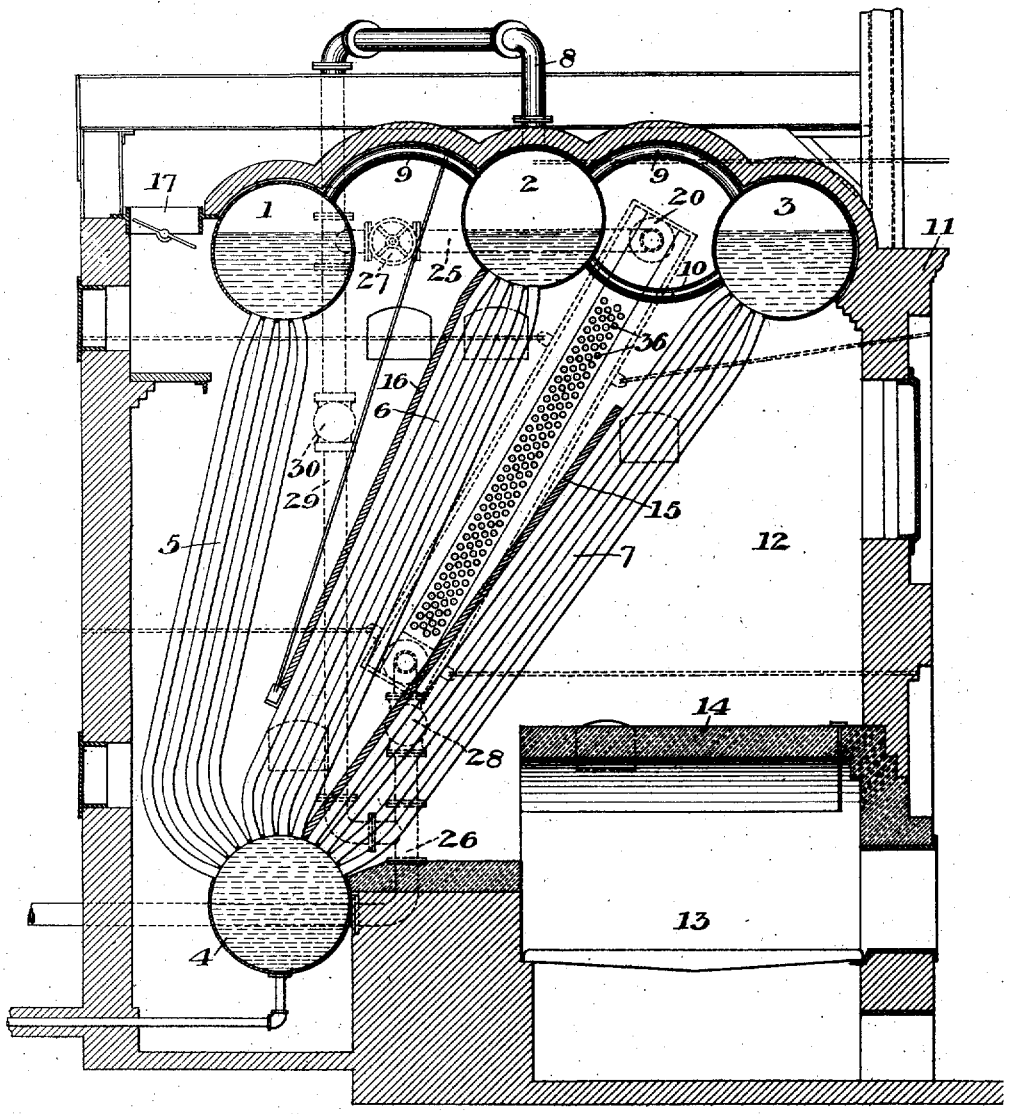

Figure 1 is a transverse section through the boiler, showing my superheater applied thereto. Fig. 2 is a longitudinal section of the same. Fig. 3 is a face view of the superheater; Fig. 4, a side view thereof, mostly in section; and Fig. 5, a detail sectional view of the skeleton frames for connecting the tubes to the steam-chamber.

The boiler illustrated, as above stated, is of the well-known Stirling type, and the same comprises the upper steam and water drums 1, 2, and 3, the lower mud-drum 4, and the three series of tubes 5, 6, and 7, connecting the mud-drum with the steam and water drums 1, 2, and 3, respectively. The feed-water inlet is connected to the drum 1, and the steam-outlet 8 may be connected to the middle drum 2. The steam and water drums are connected by the steam-collecting-pipes 9 and the drums 2 and 3 by the circulating-pipes 10. The several drums, tubes, and pipes are inclosed by the usual masonry walls 11, forming a heating-chamber 12. At the front and near the bottom is the grate 13, and above the same is the ignition-arch 14. Just back of the series of tubes 7 is the baffle wall or plate 15, and back of the series of tubes 6 is the baffle plate or wall 16. The outlet to the chimney is at 17.

The construction so far described is the common type of Stirling boiler, and as the same forms no part of my invention a further detailed description thereof is unnecessary. Suffice it to say that the feed-water entering the drum 1 passes through the tubes 5 down into the mud-drum 4, and from thence, inasmuch as the greatest heat is at the front of the furnace-chamber, it passes upward through the series of tubes 7 to the drum 3, the steam passing over the drum 2 by the pipes 9 and the water to the same drum through the pipes 10, and thence said water descends through the tubes 6 to the mud-drum, thereby establishing the well-known circulation of the Stirling boiler.

The superheater is shown at 20, and in the specific boiler illustrated two such superheaters are shown, one on each side of the heating-chamber and projecting into the same toward the middle thereof, although it will be understood that either one or more than two such superheaters may be employed, as necessary or convenient. These superheaters are shown located between the baffle-wall 15 and the series of tubes 6, as the space therebetween is the most convenient space in the particular boiler shown and the heat at this point is also very high. It will be understood, however, that in so far as the claims relate to the type of the superheater it may be located at any other point in the furnace-chamber, if desired or found necessary, and the position thereof will be varied according to the type or design or location of the particular water-tube boiler to which it is adapted; but the location of the superheater is of especial advantage, and I intend to claim it as such independently of the particular construction of such superheater. The superheater comprises the chamber or header 21, which is provided with a longitudinal diaphragm 22, thereby dividing said header into two compartments or passages 23 and 24, respectively. One of these compartments—as, for instance, the compartment 23—is connected by a suitable pipe 25 to the steam-collecting pipe 8, while the other compartment—as, for instance, the compartment 24—is connected by the pipe 26 to the engine. In the particular superheater illustrated the steam-inlet to the compartment 23 is shown at the upper end thereof, while the steam-outlet from the compartment 24 is shown at the lower end thereof. My invention, however, is not limited to this arrangement, as the inlet and outlet may both be arranged at the same end of the header or be the reverse of that shown. The steam-inlet to the header for economical purposes will preferably be connected to the end of the header nearest the steam-collecting chamber of the boiler, while the outlet from the header will be connected to that portion of the header which can most conveniently be connected to the engine. The inlet-pipe 25 is provided with a cut-off valve 27, and the outlet-pipe is provided with a similar valve 28. By means of these valves the superheater can at any time be cut out. A by-pass pipe 29, having a cut-out valve 30, is provided around the superheater, so that in case the superheater becomes disabled steam can be taken from the steam-collecting chamber of the boiler directly to the engine.

The front and rear walls and the diaphragm or partition of the header are provided with alining openings 31, 32, and 33, respectively, in which openings are fitted the skeleton frames or "lanterns," as they are called, 34. To the rear ends of the skeleton frames are attached the forward ends of the outer tubes 36, said tubes having closed rear or outer ends. Within the skeleton frames or lanterns 34 are other skeleton frames 37, which extend from the front wall of the header to the diaphragm 22 and which have connected to their rear ends the inner circulating-tubes 38, these tubes extending back into the tubes 36 and having their rear open ends in proximity to the closed ends of the outer tubes. The skeleton frames 34 and 37 are cut away, so that free communication is had between the compartment 23 and the inner tubes 38 and the compartment 24 and the outer tubes 36, and said frames are held in place by means of the yokes 39 and bolts 40.

The construction of this superheater with a header having two compartments, the inner and outer tubes, the skeleton frames, and the joint between said frames and the header is substantially the same as that of the well-known Niclausse boiler and further detailed description thereof is unnecessary. Suffice it to say that the steam entering said superheater-header passes from the compartment 23 through the skeleton frames 34 and 37 into the inner circulating-tubes 38 and through the latter to the rear ends of the outer tubes 36 and thence passes forward through the annular space between said tubes and through the opening in the skeleton frame 34 to the compartment 24 and thence to the place of use.

This superheater is shown with its header set into the wall of the furnace-chamber, with the tubes projecting into said chamber. This is deemed the preferable construction, as the superheater can be readily removed in order to repair the same, and the tubes thereof are exposed on the outside, so that they can be removed and replaced at pleasure and even while the flame and gases are passing through the superheater-tubes. This arrangement also protects the header from the heat and insures a tight connection between the tubes and the header at all times. This arrangement, however, is not essential, as the header may be located entirely outside the furnace-walls or inside the same and need not necessarily be at the sides of the boiler, but can be either in front, at the rear, or top thereof. Neither need it be in the inclined position shown, this being merely chosen for illustration, as with the particular arrangement of boiler water-tubes illustrated this is preferable.

It will be observed that the superheater occupies a minimum amount of space, is so constructed that it can be easily removed from the boiler-furnace, if necessary, and so that the tubes can be removed and replaced individually for purposes of repair, and at the same time it offers a large heating-surface, thereby rendering it very efficient.

What I claim as my invention, and desire to secure by Letters Patent, is—

1. In a superheater for steam-boilers, the combination with a heating-chamber, of water-tubes therein, a header located outside of said chamber and having two compartments, tubes removably connected thereto and projecting into the chamber between the water-tubes, said tubes comprising outer tubes communicating with one of the header-compartments and inner tubes communicating with the other header-compartment, said header having in its outer wall openings opposite said tubes of sufficient size to permit the removal and insertion of said tubes, connections between the steam-collecting space of the boiler and one of the header-compartments, and steam-outlet connections from the other header-compartment.

2. In a superheater for steam-boilers, the combination with a heating-chamber, of a water-tube boiler therein, a header located outside of said chamber and provided with a longitudinal diaphragm forming two compartments therein, alining openings in said diaphragm and the header-walls, skeleton frames removably secured in said openings and communicating with both of said compartments, outer tubes connected to the inner ends of said frames and projecting into the heating-chamber and having closed rear ends, open-ended tubes within said outer tubes and having their forward ends connected to the skeleton frames at the diaphragm, connections between the steam-collecting space of the boiler and one of the header-compartments, and steam-outlet connections from the other header-compartment.

3. In a superheater for steam-boilers, the combination with a heating-chamber, of two elevated steam and water drums and a lower mud-drum therein, a cluster of water-tubes connecting the front steam and water drum with the mud-drum, a cluster of water-tubes connecting the rear steam and water drum with the mud-drum, a cluster of superheating-tubes projecting into the space between said clusters of water-tubes, a header located outside of said chamber and having the tubes connected thereto so as to be independently removable, and steam inlet and outlet connections for said header.

4. In a superheater for steam-boilers, the combination with a heating-chamber, of two elevated steam and water drums and a lower mud-drum, a cluster of tubes connecting the front steam and water drum with the mud-drum, a cluster of tubes connecting the rear steam and water drum with the mud-drum, a header having two compartments located outside of the heating-chamber, superheater-tubes connected thereto and projecting into the heating-chamber between the said clusters of tubes, said superheater-tubes being independently removable and comprising outer tubes communicating with one of the header-compartments and inner tubes communicating with the other of the header-compartments, steam-inlet connections to one of said compartments, and steam-outlet connections from the other of said compartments.

5. In a steam-boiler, the combination with a heating-chamber, of a header located outside of said chamber, independently-removable superheating-tubes connected to said header and projecting into said chamber, connections between the steam-collecting chamber of the boiler and said header, a steam-outlet from said header, a by-pass pipe around said header, and cut-off valves in said connections and by-pass pipe.

6. A water-tube boiler having separated sets of water-tubes, a superheater between the sets and arranged in the direct path of the gases after leaving the set of water-tubes in front of said superheater, and a baffle between the superheater and said front set of water-tubes.

7. A water-tube boiler having upper and lower transverse drums connected by separated banks of water-tubes, a superheater having tubes between two of the banks of water-tubes and arranged in the direct path of the gases after leaving the bank of water-tubes in front of it, and a baffle extending along the rear of the last-named bank of water-tubes.

8. A water-tube boiler having separated sets of water-tubes, a superheater between the sets, and a baffle between the superheater and one of said sets.

In testimony whereof I have hereunto set my hand.

JAMES P. SNEDDON.

Witnesses:
WALTER L. LUCAS,
J. C. FRANK.